US007015596B2

(12) United States Patent
Pail

(10) Patent No.: US 7,015,596 B2
(45) Date of Patent: Mar. 21, 2006

(54) ELECTRONIC DEVICE DISPLAY SYSTEM AND METHOD

(76) Inventor: Opher Pail, 625 Main St., No. 1433, New York, NY (US) 10044

( * ) Notice: Subject to any disclaimer, the term of this patent is extended or adjusted under 35 U.S.C. 154(b) by 0 days.

(21) Appl. No.: 10/883,537

(22) Filed: Jul. 1, 2004

(65) Prior Publication Data

US 2005/0001485 A1 Jan. 6, 2005

Related U.S. Application Data

(60) Provisional application No. 60/485,263, filed on Jul. 3, 2003.

(51) Int. Cl.
*H02J 1/10* (2006.01)

(52) U.S. Cl. ............................ 307/28; 307/20; 307/25

(58) Field of Classification Search .................. 307/20, 307/28, 25
See application file for complete search history.

(56) References Cited

U.S. PATENT DOCUMENTS 3,414,806 A 12/1968 Carr
5,164,652 A 11/1992 Johnson et al.
5,264,958 A 11/1993 Johnson
5,341,124 A * 8/1994 Leyden et al. ........... 340/568.4
5,535,274 A 7/1996 Braitberg et al.
5,660,567 A 8/1997 Nierlich et al.
5,783,926 A 7/1998 Moon et al.
5,818,197 A 10/1998 Miller et al.
5,822,427 A 10/1998 Braitberg et al.
5,836,785 A 11/1998 Lee
6,064,177 A * 5/2000 Dixon ........................ 320/111
6,368,155 B1 4/2002 Bassler et al.
6,386,906 B1 5/2002 Burke
6,509,659 B1 * 1/2003 Carroll et al. .............. 307/125
6,690,277 B1 * 2/2004 Hansen et al. ........... 340/568.2
6,698,597 B1 * 3/2004 Marihugh .................... 211/26
2002/0154243 A1 * 10/2002 Fife et al. ................... 348/372
2002/0189842 A1 12/2002 Burke

* cited by examiner

*Primary Examiner*—Brian Sircus
*Assistant Examiner*—Brett Squires
(74) *Attorney, Agent, or Firm*—Tiajoloff & Kelly

(57) ABSTRACT

A system and method are provided for displaying electronic devices operable when electrical power is supplied to them at respective operating voltages through respective power connectors. The system has a power supply providing input electrical current at a first voltage and cable structures each connected with the power supply and having a respective power connector electrically connecting with the power receiving structure of one of the electronic devices. The cable structures each include a voltage regulator system that receives the input electrical current, converts it to an output electrical current at an output voltage, and transmits it to the power connector, so as to transmit an operating electrical current to the associated electronic device. The voltage regulator system sets the output voltage of the output electrical current such that the operating electrical current delivered to the associated electronic device has a voltage that corresponds to the operating voltage of that device. This is accomplished by connecting the voltage regulator to a calibrating component with a selected electrical characteristic that sets the output voltage. A security circuit creates an alarm when separation of the electrical device from the system occurs.

54 Claims, 8 Drawing Sheets

ELECTRONIC DEVICE DISPLAY SYSTEM AND METHOD

RELATED APPLICATIONS

This application asserts priority based on U.S. provisional patent application Ser. No. 60/485,263 filed by Opher Pail on Jul. 3, 2003.

FIELD OF THE INVENTION

This invention relates to the field of displays for electronic devices, and more particularly, to displays that support multiple devices to which electrical power is supplied for permitting consumers to try the equipment operating with electrical power. This invention especially relates to displays of multiple cameras or camcorders that customers in a store can actually use to select the best product to buy.

BACKGROUND OF THE INVENTION

Systems for displaying electronic devices in a store have been devised that supply electrical power to the devices so that a potential buyer can actually pick up and use the electronic device, such as a camcorder or camera, in the store before purchasing it, to select the best model for that particular customer.

One such system is shown in U.S. Pat. No. 6,386,906 B1 to Burke (herein incorporated by reference). This system is configured to support several different electronic devices made by different manufacturers, which require different power cables and jacks, and often require different voltages. To supply the different voltages, the system has several transformers that convert 110 volt AC current to DC current at three voltages, e.g., 4.5, 7, and 8 volts. Each device is connected to a power supply base by a cable that carries the DC current for all three voltages. At the other end of the cable, an appropriate jack is provided connected to the appropriate conductor of DC for the required voltage of the associated electronic device.

Systems of the prior art have the disadvantage that they support only devices that can work with the set of voltages provided by the transformers of the base power supply, and updating the system to other different voltage levels for new devices to be displayed requires modification of the circuitry of the base. There are many camcorders on the market, and they have a wide variety of voltages that are required, some being listed below in Table 1. It is not possible to provide such a wide range of possible voltages using systems of the prior art without substantial modifications.

TABLE 1

| | |
|---|---|
| Panasonic PV-DV53D | 7.2 v |
| Panasonic PV-DV353D | 6 v |
| JVC GR-SXM250V | 11 v |
| Canon ZR60A | 8.4 v |
| Sharp VL-NZ50 | 10 v |
| Sharp WLAH151 | 7 v |
| Olympus C-50 | 4.8 v |
| HP 850 | 6 v |
| Kodak LS443 | 5 v |
| Olympus C-720 | 6.5 v |
| Fuji 3800 | 5 v |
| Kodak CX4230 | 3 v |
| Olympus D-390 | 3.4 v |

Another drawback of the prior art is that the cable carrying power requires a number of wires, because there are three currents at different voltages, making the power cable heavier and more expensive. Also, the length of the cord can result in a substantial drop in voltage relative to the input voltage, due to resistance in the cable, with the output voltage being less than the input voltage, and possibly outside the proper working voltage range for the associated electronic device.

SUMMARY OF THE INVENTION

It is therefore an object of the invention to provide a system for display of electronic devices to consumers that overcomes the disadvantages of the prior art, especially a system that allows for ready adaptation to electronic devices of any voltage and of any cable configuration.

It is an object of the invention to provide a system for display of one or more electronic devices. Such a system for displaying a plurality of electronic devices can comprise a power supply providing input electrical current at a first voltage and a plurality of cable structures each being connected with the power supply so as to receive the input electrical current therefrom at the first voltage. Each cable structure has a respective power connector configured to electrically connect with the power receiving structure of a respective one of the electronic devices. The cable structures each also includes a respective voltage regulator system receiving the input electrical current, converting the input electrical current to a respective output electrical current at a respective output voltage, and transmitting the output electrical current to the power connector so as to transmit an operating electrical current to the associated electronic device. The voltage regulator system sets the output voltage of the output electrical current such that the operating electrical current delivered to the associated electronic device has a voltage that corresponds to the operating voltage of the electronic device. It is also an object of the invention to provide a method for displaying one or more electronic devices. Such a method may comprise providing a base module having a power supply with a plurality of electrical connector structures each supplied with DC current at a first voltage, securing to each electronic device a respective device module, and connecting a first cable between each device module and a respective electrical connector structure of the base module so that said first cables each carry said DC current at the first voltage to the associated device module. The device modules each have a respective voltage regulator receiving the DC current and converting the DC current to a respective output current. The method further comprises connecting a second cable between each device module and the electrical device secured thereto. The second cable receives the output current from the device module and transmits the output current to a power connector complementarily engaging and electrically connecting with the power input structure of said electrical device. The output current is transmitted to the electrical device at a voltage corresponding to the operating voltage of said device. Each of the voltage regulators sets the associated output current at a voltage that is dependent on an electrical characteristic of a respective calibrating component connected therewith. The calibrating component is part of the associated second cable connected with the device module.

It is also an object of the invention to provide a module for attachment to an electronic device on display. A module of this invention may comprise a housing including a securement structure configured to secure the module to the electrical device. A power input is supported on the module and configured to be connected with a power input cable so as to receive therefrom an electrical current having an input voltage. A voltage regulator is supported in said housing and has an input and an output. The input is electrically connected with the power input so as to receive the electrical current therefrom. The voltage regulator is configured to convert the electrical current to an output current at an output voltage and to transmit the output current through the output. The voltage regulator has a calibrating input and is configured to set the output voltage of the output current dependent on an electrical characteristic of a calibrating component connected electrically with the calibrating input. A connector structure is electrically connected with the calibrating input of the voltage regulator. The connector structure is configured to releasably connect with a complementary connection structure so that a user can selectively connect to the voltage regulator a calibrating element having an electrical characteristic to cause the voltage regulator to set the output voltage to an appropriate voltage in view of the operating voltage of the electrical device.

It is an object of the invention to provide a base module. In a preferred embodiment, the base module comprises a power source transmitting DC electrical current at a first voltage. A plurality of electrical connector structures, each with a plurality of electrical contacts, are configured to connect with a respective complementary electrical connector having a plurality of separate electrical contacts so as to transmit said DC electrical current to the complementary electrical connector to at least one of the contacts. Two of the contacts of the electrical connector structures are connected with an alarm circuit. The alarm circuit detects whether a circuit connected to the two contacts of the electrical connection structure is closed or open. The alarm circuit is configured to initiate an alarm-set condition of the alarm circuit responsive to an initial detection that the circuit connected to the two contacts is closed. The alarm circuit is configured to trigger an audible or visible alarm responsive to a determination during the alarm-set condition that the circuit between the two contacts is open.

It is an object of the invention to provide a connector cable comprising a first electrical connector element having at least four electrical contacts configured to make four separate electrical connections when the first electrical connector element is secured in engagement with a complementary electrical connector structure. A cable portion has two opposite ends and two wires each connected with a respective one of said electrical contacts of the first electrical connector element. A device power input jack has at least two electrical contacts each connected electrically with a respective wire of the cable portion. The power input jack is configured to be matingly engaged with a power input structure of an electrical device so as to form an electrical connection therewith supplying electrical power to the electrical device at an operating voltage through said power input structure. A calibrating component is connected with two other contacts of the first electrical connector element so that a circuit containing the calibrating component is formed between the two contacts. The calibrating component has an electrical characteristic selected to cause a voltage regulator connected therewith to transmit electrical power at a voltage corresponding to the operating voltage of the electrical device.

In a particularly preferred embodiment, the connector cable comprises a connector with four contacts, two of the contacts connecting with a calibrating component and at least one of the other contacts connecting with a power supply connector configured to be received in an electronic device so as to supply power thereto.

It is similarly an object of the invention to provide such a connector cable wherein the calibrating component is adapted to co-act with a voltage regulator so as to cause the regulator to supply current at a first voltage, which voltage is appropriate for powering a device having a power receiving structure that is configured to fit with the power supply connector.

It is further an object of the invention to provide a system for displaying one or more electronic devices comprising one or more of the above components.

Other objects and advantages of the invention will become apparent from the disclosure herein.

DETAILED DESCRIPTION

Figure 1:
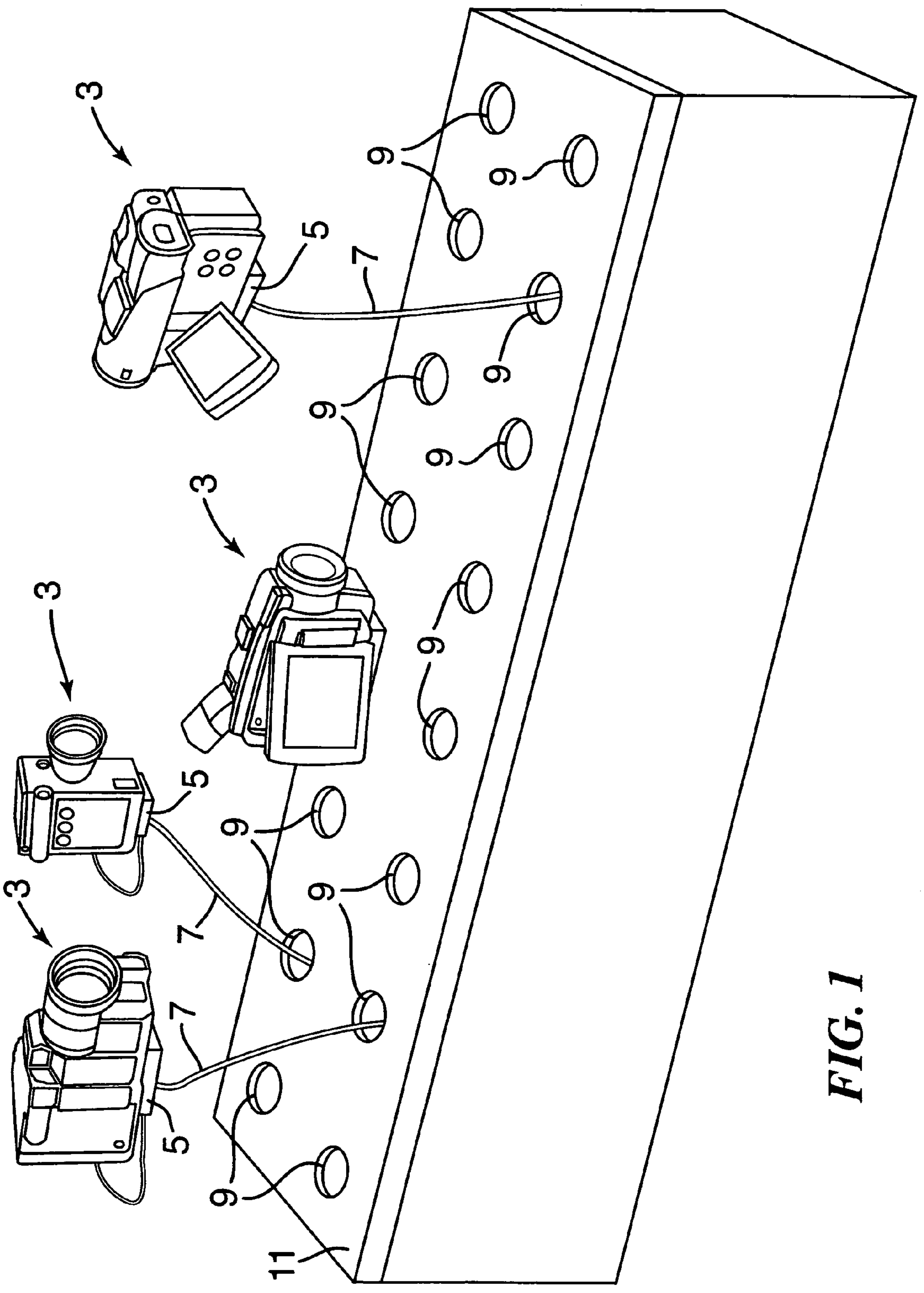
FIG. 1 is a perspective view of a display system according to the invention.
Figure 2:
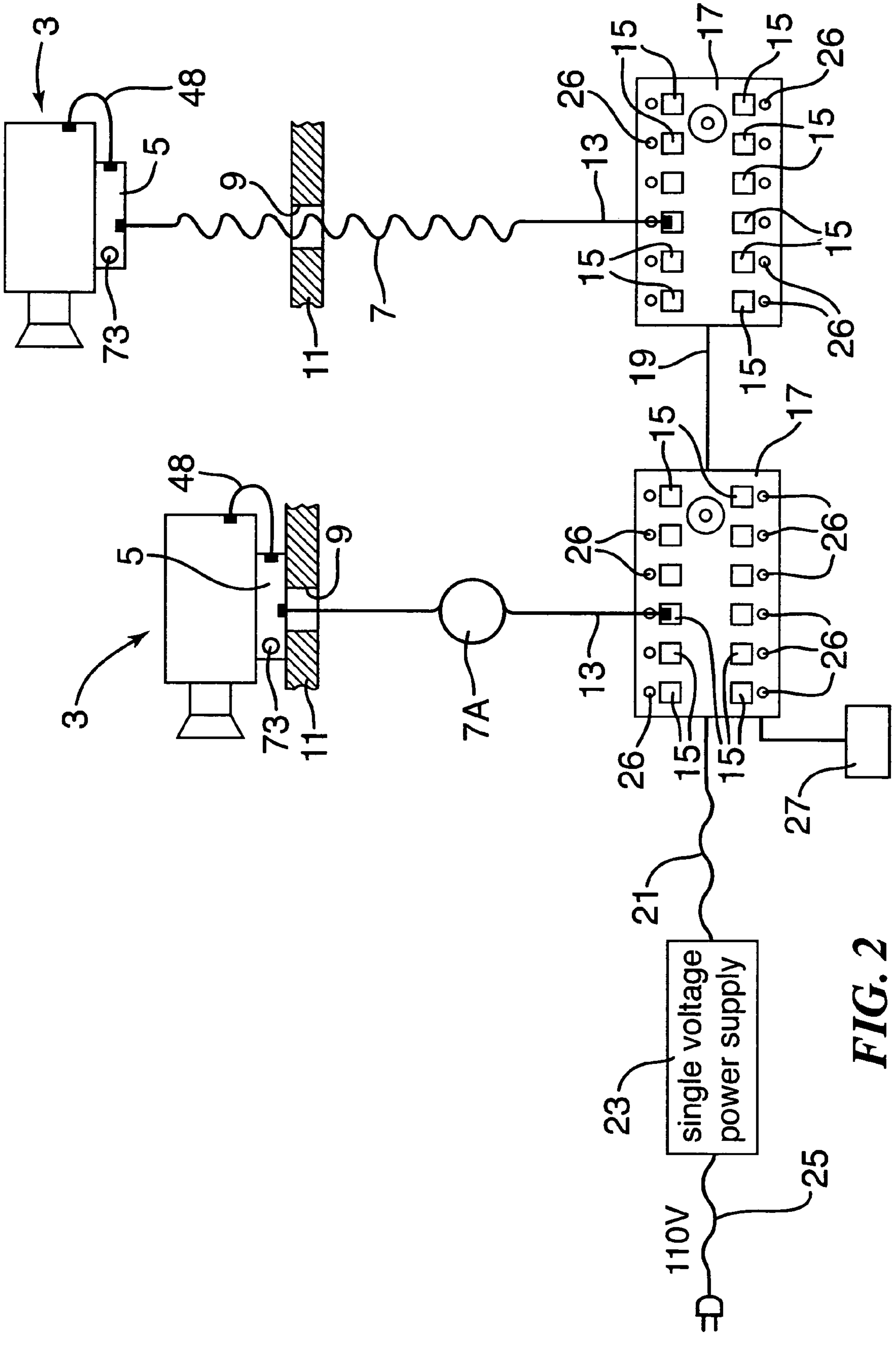
FIG. 2 is a diagram of a display system according to the invention.

As best shown in FIGS. 1 and 2, an electronic device display is illustrated for displaying to customers one or more electronic devices 3, which in the preferred embodiments are camcorders or cameras, connected by cable structures to a base module.

Each camcorder 3 has secured thereto a device module or security circuit housing 5. The security module 5 has a connection structure or socket receiving the end of a flexible cable 7 that extends through an aperture 9 in a display cover plate 11, which encloses the display system so that the consumers do not see the power supply or other equipment supporting the display. The cable 7 is preferably a flexible coiled cable, or a cable with a spring loaded take-up reel or recoiler unit 7A.

The cable has a distal end 13 with a connection structure that is plugged into one of a number of modular connection structures or sockets 15 in one or more power supply base modules 17. The base modules 17 are connected to each other by an expansion cord 19. The first of the base modules 17 is connected by power cable 21 to single voltage power supply 23, which is in turn connected to a power cable and plug 25 that connects to a wall socket and receives therefrom standard AC current, which in the United States is normally 110 volts. The power supply 23 converts the 110 volt AC to DC at a system operating voltage that is selected to be at least as high as the maximum voltage required to supply any electronic device 3 to be supported on the display. In the preferred embodiment, the DC voltage is 15 volts.

The DC current flows through cable 21 to the first base module 17, to a PCB board therein that transmits the DC power to each of the multiple sockets 15, wired in parallel to share the power. There are preferably 16 to 25 socket outlets 15 in each base module 17. The expansion cable 19 is also wired in parallel, and transmits the DC current to the next base module 17, where the DC current is transmitted to the multiple sockets 15 thereof wired in parallel. All sockets 15 in both base modules receive the DC current at the same system operating voltage, e.g., 15 volts.

Each of the sockets 15 is configured to receive a complementary connection structure or plug therein that is preferably an Ethernet-type jack that securingly clips into the socket 15 and provides six leads or electrical contacts coming from the socket 15. Two of these leads transmit the DC power at the system operating voltage. Two are preferably ground, and two of the leads connect with wires that are the in and out lines for a security circuit that is closed when the other end of the cable 7 is plugged into the security module 5, and the security module 5 is secured to the electronic device 3 displayed. If the security module 5 is separated from the device 3, it breaks the circuit, and if the cable 7 is detached from the security module 5, or if it is cut to release the device from the display, the security circuit is broken. Generally, the structure securing the security module 5 to the device 3 is a bolt screwed into the device 3, and the bolt closes the security circuit. If, to separate the device 3 from the security module, this bolt removed, there is an interruption in the circuit, creating an alarm condition.

Figure 5:
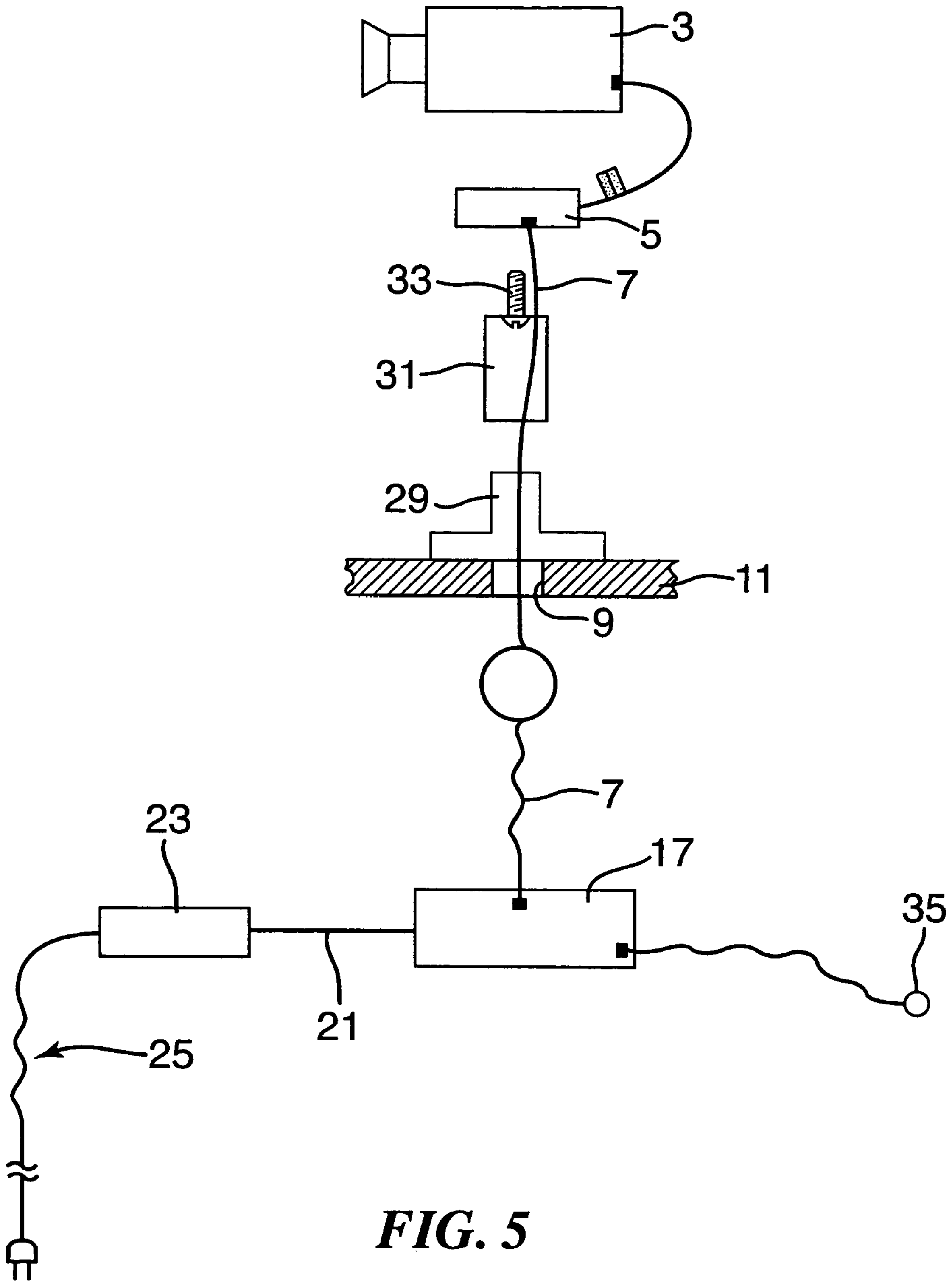
FIG. 5 is an exploded diagram of a modified alternate arrangement of the system of the invention.

An example of such a structure can be seen in FIG. 5, which shows an exploded schematic diagram of the system with a molded support for the device 3, similar to the system of FIGS. 1 and 2 with similar parts having the same reference characters. Cable 7 extends through opening 9 and through a molded stalk base 29 mounted thereon. Stalk base 29 can supportingly receive thereon tubular stalk upper portion 31, which has an interior bore through which bolt 33 extends. Bolt 33 goes through security module 5 and bolts into device 3. Bolt 33 is part of the connection of the wires in cable 7, and tampering with it breaks the circuit, so as to create an alarm condition The PCB circuit in each base module 17 includes a main alarm circuit that illuminates a bi-color LED 26 for each of the sockets 15 selectively for different circuit conditions. During initial setup, the LED 26 for the circuit flashes green. Once a device is correctly plugged into the socket 15, the alarm circuit detects that the security circuit is completed by sending an alarm sense signal through the security circuit, and the LED is illuminated a steady green, indicating a key-on or alarm-set condition. If there is an unsafe line indication, e.g., the security circuit is not completed, the LED illuminates a steady red.

Once the security circuit is completed and the LED is lit steady green, the alarm circuit continuously or periodically tests whether the security circuit is closed or open by sending an alarm sense signal through it. If the alarm circuit detects that the security circuit is open, i.e., cut, indicating, for example, that the device 3 has been unplugged or the cable 7 has been cut, it triggers an alarm condition and activates a visible or audible alarm. Preferably, the base module 17 has an audible alarm (preferably a very loud one) that alerts store personnel, and, during the alarm condition, the LED illuminates a flashing red. The alarm can be turned off by an operator control, such as remote 27 (FIG. 2) or key switch 35 (FIG. 5). The base module can also be connected with an auxiliary alarm to enhance the alert, such as by an even louder alarm system or a brighter visible alarm light.

The base module 17 also has a rechargeable battery power supply that maintains some aspects of the system, e.g., the security alarm, independent of the supply of AC power to the transformer 23, and any control circuitry, such as the key switch with which an operator can turn the system on or off with a key.

Figure 3:
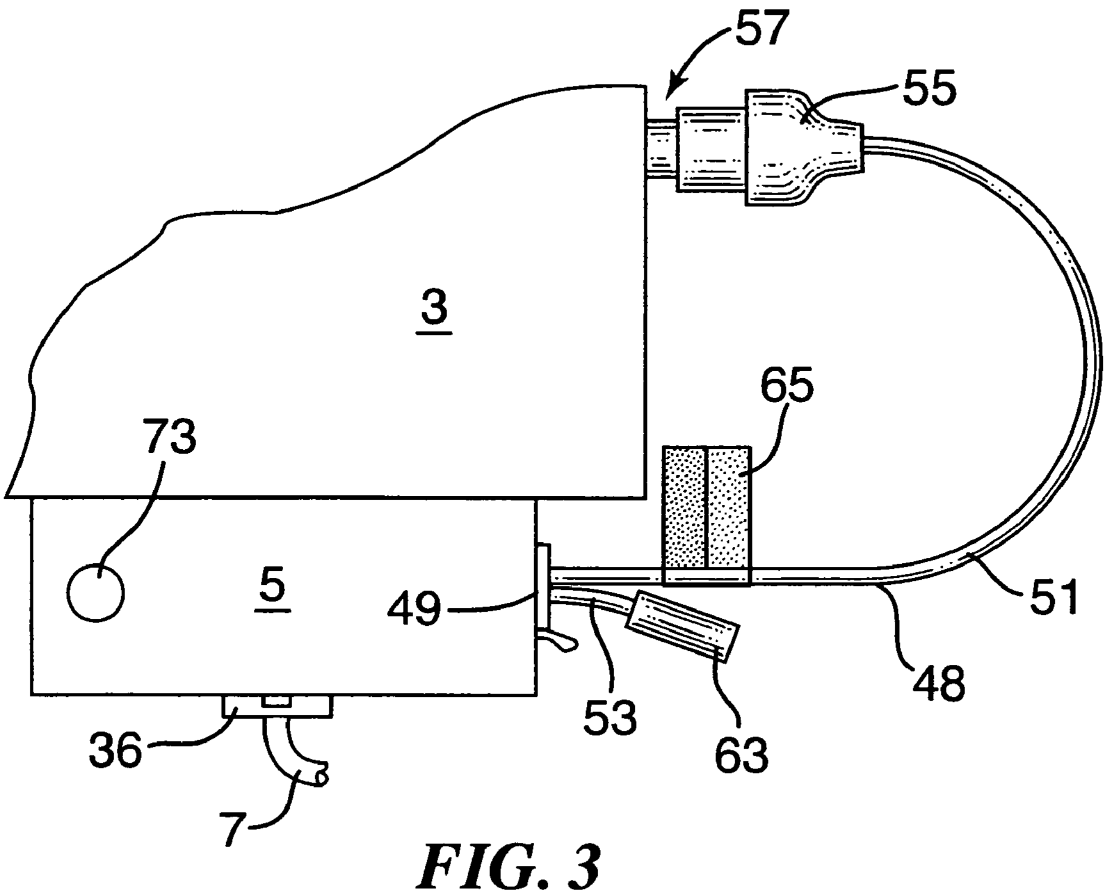
FIG. 3 is a detail view of the security module attached to the electronic device and the connector cord supplying power therefrom to the device.

Referring to FIG. 2, security module or device module 5 has an input connection structure or socket receiving the end of cable 7. This socket is preferably also a six-wire Ethernet-type female socket that matingly receives a complementary connection structure in the form of male Ethernet jack 36 at the end of cable 7 (see FIG. 3). This socket connects the six wires of cable 7 to a PCB circuit board housed in the security module 5.

Figure 6:
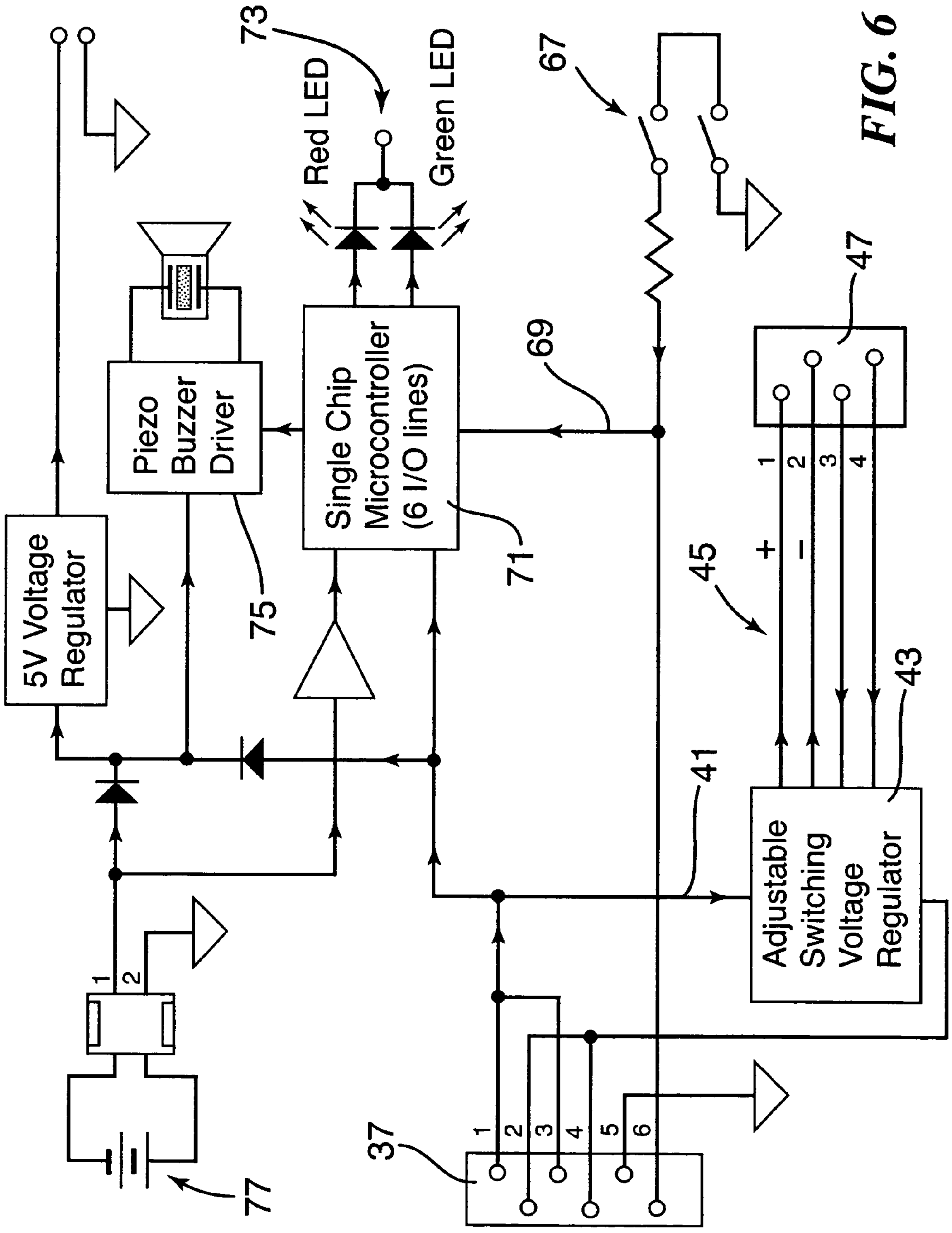
FIG. 6 is a schematic of the circuitry inside the security module.
Figure 7:
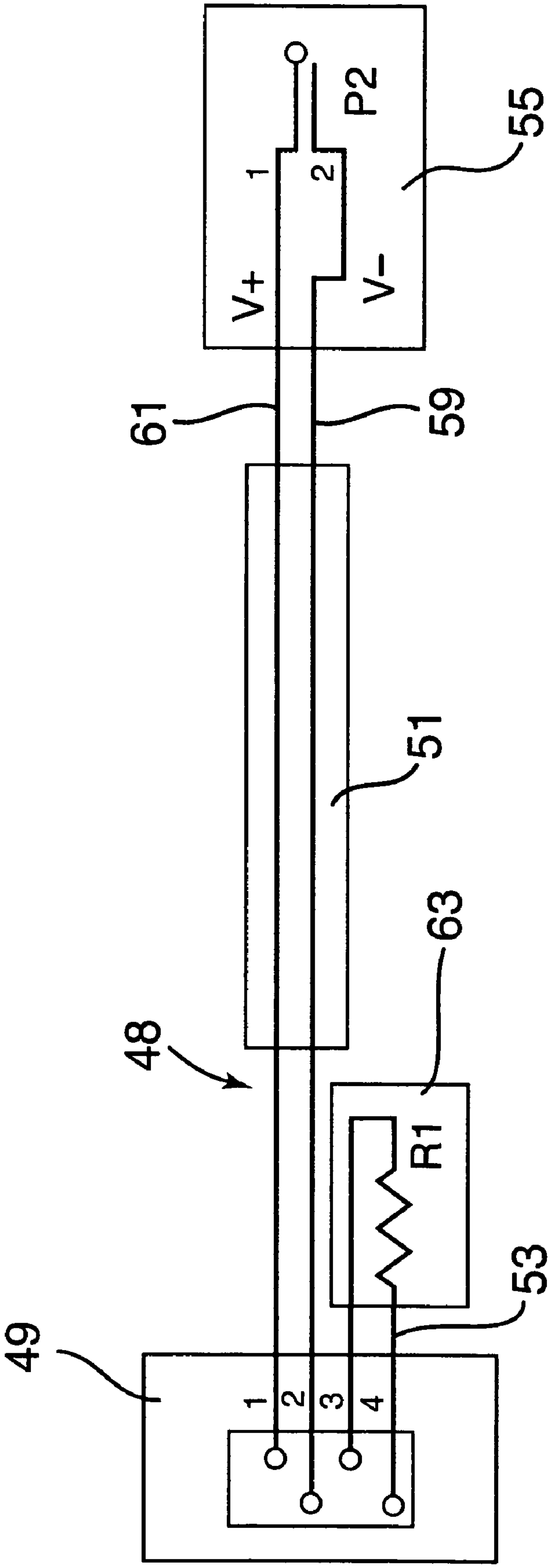
FIG. 7 is a schematic of a connector cord linking the security module to the electronic device on the display.

FIG. 6 illustrates the circuit and its functionality. The socket 37 connects with the six wires of cable 7. Pins 1 and 3 are the positive power input delivering DC current from the base module at the system operating voltage, in the preferred embodiment, 15 volts DC power. Pins 2 and 4 are power ground, or alternatively, the opposing pole of the power of respectively, pins 1 and 3. Pin 5 is signal ground for the alarm sense signal and a jumper to pin 4 to use as a cable sense. Pin 6 represents the lead receiving the alarm sense signal. Preferably, to minimize noise the cable is organized as three twisted pairs of wires, i.e., pins 1 and 2, pins 3 and 4, and pins 5 and 6.

Pins 1 and 3 are involved in sending power to the device 3. DC current at the system DC operating voltage, e.g., 15 volts, flows in and through line 41 to adjustable switching voltage regulator 43. This voltage regulator 43 converts the voltage in line 41 to the appropriate voltage for the device 3 and transmits the resulting output current through a power output of regulator 43. The voltage regulator 43 in the preferred embodiment is sold by Micrel, Inc., of 1849 Fortune Drive, San Jose, Calif. 95131 under the designation MIC4684, called the 2A high-efficiency SuperSwitcher™ Buck Regulator.

Figure 4:
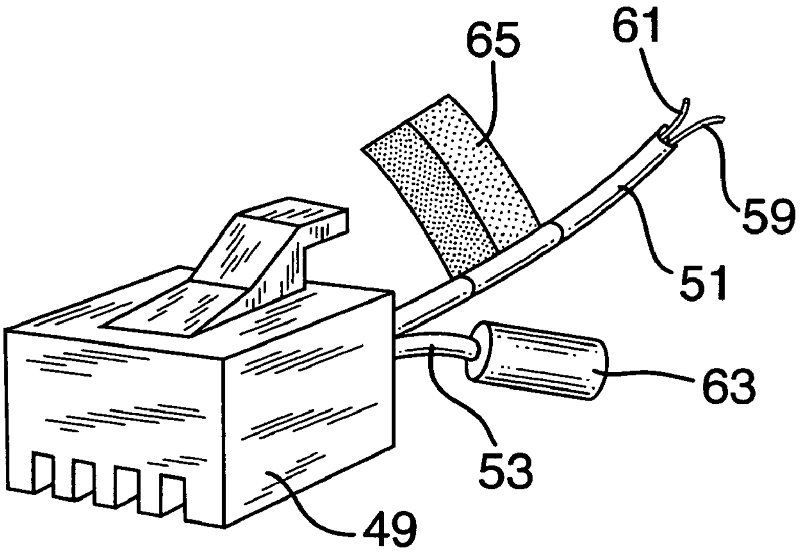
FIG. 4 is a perspective view of a one end of a connector cord according to the invention.

Adjustable switching voltage regulator 43 has four lines indicated at 45 that run to a connection structure 47 in the form of standard modular 4-point telephone jack socket at one end of connector cable 48. As a more preferable alternative, a USB socket (not shown) may be used instead of a telephone jack, as the USB jack and socket assembly is smaller and reduces the size of the module 5. This socket 47 receives a complementary connection structure in the form of male 4-point jack 49, best shown in FIGS. 3 and 4. This jack 49 is connected with two two-wire cables 51 and 53. Cable 51 is preferably 24/26A WG or 24 gauge two-wire cable, and it carries the DC power to a connection structure or jack 55 that is plugged into the power input connection structure or socket generally indicated at 57 of the device 3. The connection structure or jack 55 is configured to matingly connect with the specific and particular type of connection structure or socket in the device 3, and is configured to match the power input jack of the particular manufacturer of the device for that device. These jacks vary substantially from manufacturer to manufacturer. Pins 1 and 2 are the power-in (positive voltage) and power-out (negative voltage) lines that send the output DC current from regulator 43 to the device 3, and these connect with the jack 55 through the two wires or lines 59 and 61 of cable 51.

Pins 3 and 4 of the jack 49 connect a calibrating voltage set input of voltage regulator 43 through wire 53 to a regulator calibrating component 63, which is preferably a resistor, and that co-acts with the regulator 43 to set the voltage level of the DC power output of regulator 43 sent to pins 1 and 2. For different values of an electrical characteristic, e.g., resistance of regulator calibrating component 63, the regulator 43 produces different output voltages. Where the voltage programming component 63 is a resistor, the voltage is low enough that only a minor amount of heat is released. Preferably, the resistor is a ⅛ or ¼ W resistor with an appropriate resistance value, with a 1% tolerance.

In the preferred embodiment, the connector structure is a male USB jack with a molded body. The calibrating component 63 is supported in the body of the USB jack 49, preferably embedded in the plastic molding so as to be invisible to the user, and less exposed to damage.

The connector cable 48 is thus formed of a four-point jack, a calibrating component 63 that sets the appropriate output voltage that the regulator should generate for the specific device 3, and a power supply line to a jack configured to be received in the power input connection structure 57 of the specific device 3. The cable is consequently unique to the device 3 or to the set of devices that use the same input structure and voltage, usually a group of products by the same manufacturer. This connector cable is preferably identifiable by a color coded marking, such as tag 65, or else a coloring of the cables, such as one color indicating a particular voltage and the other the shape of power input jack.

Figure 8:
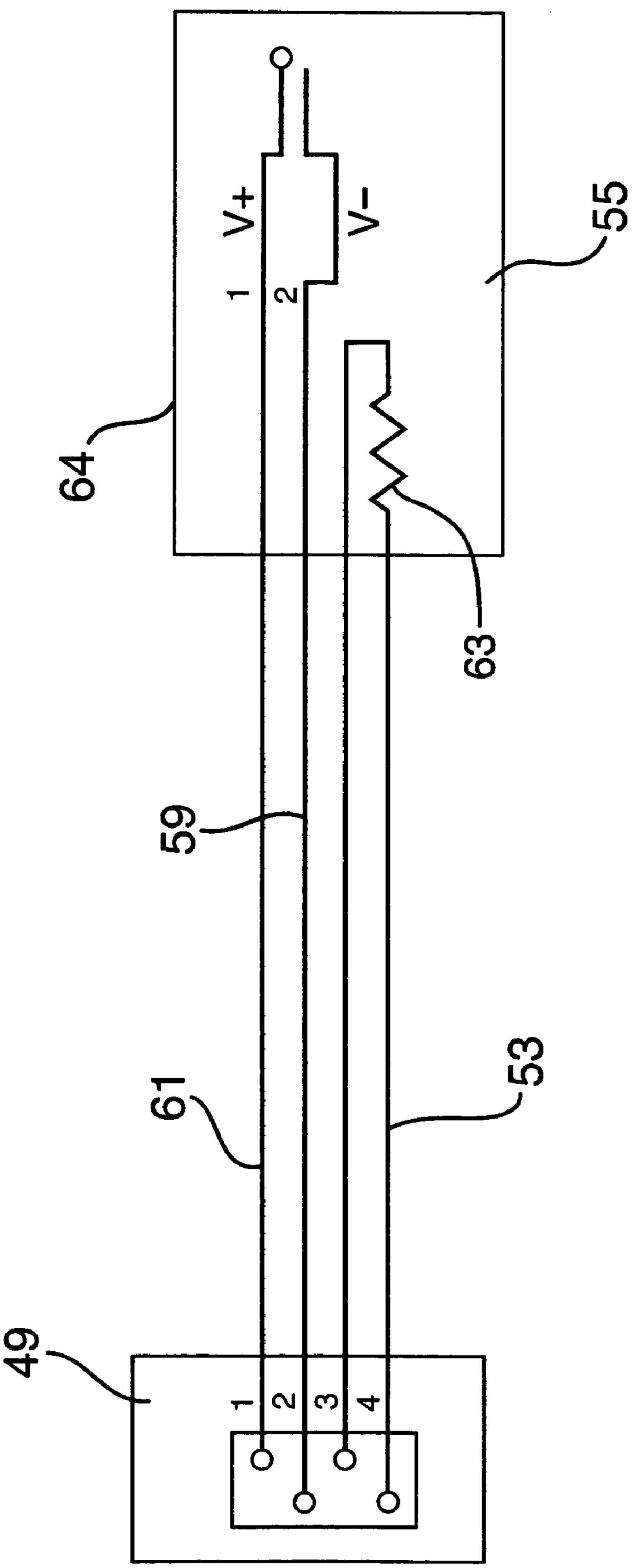
FIG. 8 is a schematic of an especially preferred embodiment of the connector cord linking the security module to the electronic device on the display.

Another embodiment of the connector cable 48 is seen in FIG. 8. In this embodiment, the power input connector structure is preferably an injection-molded plastic structure enclosing the requisite electronic components for connecting to and powering device 3. In addition, this plastic housing 64 preferably contains the resistor or calibrating component 63 that sets the appropriate output voltage for the device 3 imbedded therein. The four-wire cable is relatively easy to assemble with the components. The plastic housing is preferably configured to resemble the normal manufacturer's jack for the device, with the component 63 not visible to the consumer testing the product.

The security module circuit board shown in FIG. 5 also provides additional security features similar or complementary to those of the base module 17. Pin 6 is connected to the security circuit portion in the module 5, and transmits an alarm sense signal along a line to tamper switches 67 that are both closed when the device 3 is secured to the device module 5. If either tamper switch 67 should open, indicating that the device is somehow separated from the security module 5, this is detected at the base module, and creates an alarm condition, intended to occur when the device is separated from the security module or the cable 7 to the base module 17 is cut. When the security circuit is broken, the alarm sense line 69 is activated, and microcontroller 71 causes the LED 73 to flash red, and also activates or enables the buzzer alarm circuit 75, which generates a loud alarm. This alarm is powered by the battery 77, preferably a 9 volt alkaline battery, whether or not power is being received from the cable 7.

The DC power received from cable 7 is also directed to the microcontroller 71 over a power sense line enabling the microcontroller to determine if the module 5 is receiving power from the cable 7. The DC power is also transmitted through an isolation diode to power the buzzer system 75, and to a 5 volt voltage regulator, which converts the voltage to 5 volts DC current and uses this to power the integrated circuits and chips of the PCB board in the module 5.

The battery 77 is also connected with the 5 volt voltage regulator to power the ICs if the power from cable 7 is interrupted. The power is transmitted to the 5 volt regulator and buzzer through an isolation diode. A low-battery detection component is also electrically connected with the battery, providing an input to the microcontroller 71 that enables it to alert a user of the need for a recharge or replacement of the battery 77.

Microcontroller chip 71 also provides for other control of the LED 75 to show whether power is being received at the circuit from cable 7 (a steady green LED), and whether the battery is low (flashing red with no buzzer).

With small electrical devices especially, it may be desired to reduce the size of the device module 5 as much as possible. A substantial reduction of size can be achieved by eliminating the alarm circuitry in the device module 5, i.e., eliminating the alarm sense line 69, the audible alarm circuit 75, the buzzer, and the battery 77. When these are eliminated, if someone detached the electrical device 3 from the module 5 or cuts the wire, or otherwise breaks the security circuit, the alarm circuit of the base module is relied on to serve as the alarm system.

Figure 9:
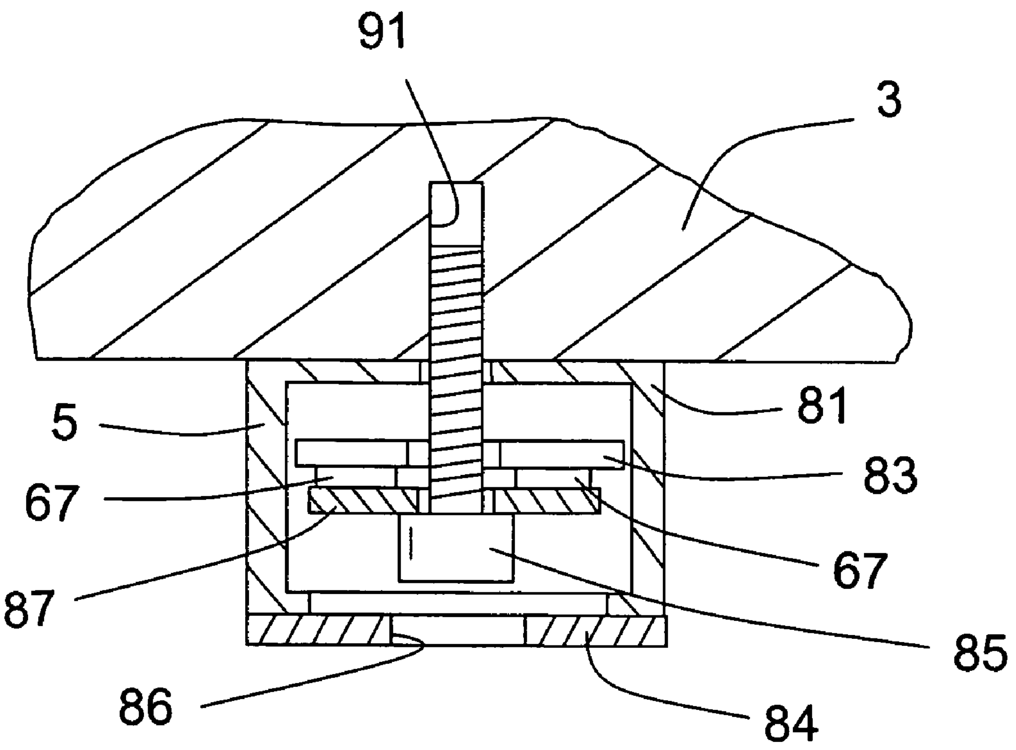
FIG. 9 is a detail view of the securement of a device module to an electronic device being displayed.

The securement structure that is preferably used to secure the device module 5 to the electronic device 3 is shown best in FIG. 9. The module 5 has a housing 81 that supports the PCB board 83 therein. A cover plate 84 covers the bottom of the housing 81 to restrict access to the interior thereof. The securement assembly comprises a securement member in the form of bolt 85 that is inserted through access opening 86 in cover plate 84, extends through a washer 87 with a hole in it, through an opening in the PCB board 83, and through an opening 89 in the housing 83, where it threadingly engages the device 3 in a threaded aperture 91 therein, which is preferably the threaded aperture provided in video cameras and other electronic devices for functions such as mounting on a tripod or other support.

Bolt 85 is tightened by a special tool similar to an Allen wrench through opening 86 to firmly secure the module 5 to device 3. The board 83 is supported fixedly in the position shown by the housing 81, and, when tightened, the bolt 85 presses against washer 87, which overlies the two tamper switches 67 on the PCB board 83. The tamper switches are biased by a spring or other means to the open (circuit broken) state thereof. However, the washer 87 presses on the tamper switches 67 against the urging of the springs, and closes them so as to complete the security circuit.

If bolt 85 were to be unscrewed from the device by a customer trying to detach the device, it would release pressure on the washer 87, permitting the tamper switches 67 to open, breaking the circuit, and triggering an alarm condition.

Figure 10:
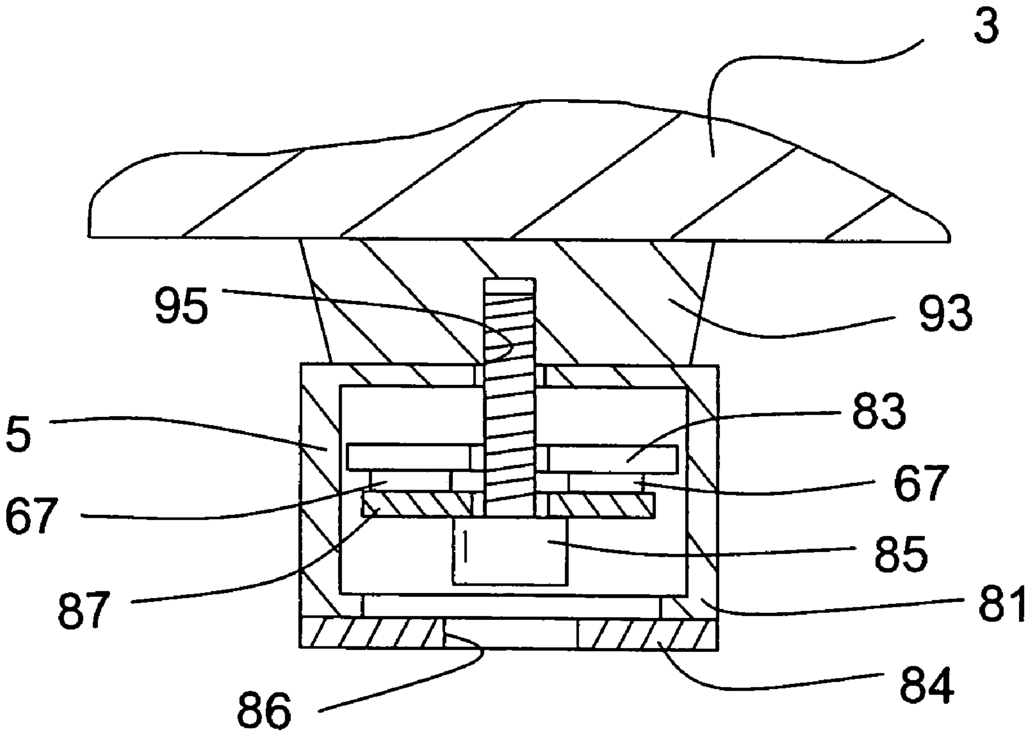
FIG. 10 is a detail view of an alternate embodiment of securement of a device module to an electronic device being displayed.

An alternate embodiment is shown in FIG. 10, wherein the module 5 is secured to the device 3 via an adapter 93. The adapter 93 is configured to be secured to the device 3 by whatever structure or other means necessary, such as adhesive, for example, or by a structural interlock with the device 3. The configuration of the adapter depends on the configuration of the device 3. A variety of connection structures can be used advantageously in this area, as will be clear to one of skill in the art. The primary consideration should be that the adapter 93 is very difficult to remove from the device 3.

The adapter 93 has a threaded bore 95 therein that screwingly receives bolt 85. Bolt 85 presses on washer 87 as in the embodiment of FIG. 9, closing tamper switches 67, and closing the security circuit. Any loosening or removal of the bolt 85 from adapter 93 to free the device 3 from module 5 will open the tamper switches 67 and trigger the alarm.

The terms used herein should be considered terms of description rather than limitation, as those of ordinary skill in the art, having this disclosure before them, will be able to make adjustments and modifications therein without departing from the spirit of the invention.

What is claimed is:

1. A system for displaying a plurality of electronic devices each being operable when electrical power is supplied thereto at a respective operating voltage through a respective power connector, said system comprising:

a power supply providing input electrical current at a first voltage;

a plurality of cable structures each being connected with the power supply so as to receive said input electrical current therefrom at said first voltage, and each having a respective power connector configured to electrically connect with the power receiving structure of a respective one of the electronic devices;

said cable structures each including a respective voltage regulator system receiving said input electrical current, and converting said input electrical current to a respective output electrical current at a respective output voltage and transmitting said output electrical current to said power connector so as to transmit an operating electrical current to the associated electronic device;

said voltage regulator system setting the output voltage of the output electrical current such that the operating electrical current delivered to the associated electronic device has a voltage that corresponds to the operating voltage of said electronic device; and wherein the voltage regulator system comprises a voltage regulator electrically connected with a calibrating component said voltage regulator being configured to vary the output voltage of said output electrical current dependent upon an electrically connected with characteristic of said calibrating component;

said calibrating component being releasably connected to the voltage regulator and being selected such that the electrical characteristic thereof causes the voltage regulator to set the output voltage thereof to correspond to the operating voltage of the electronic device.

2. The system of claim 1, wherein the electrical characteristic of the calibrating component on which the output voltage of the output current depends is resistance, and said calibrating component comprises a resistor.

3. The system of claim 1, wherein the calibrating component is electrically connected with the voltage regulator via a releasable connector structure.

4. The system of claim 3, wherein the releasable connector structure is a jack-and-socket system.

5. The system of claim 3, wherein said releasable connector structure also connects said voltage regulator system with the power connector.

6. The system, of claim 5, wherein the releasable connector structure is a jack-and-socket electrical connection system comprising a socket connected with the voltage regulator, and a jack connected to an end of a cable having an opposite end connected electrically with said power connector so that said output current from said voltage regulator flows to said power connector through said cable.

7. The system of claim 6, wherein said calibrating component is also connected with said opposite end of said cable.

8. The system of claim 7, wherein the power connector has a body and the calibrating component is supported in or adjacent said body.

9. The system of claim 6, wherein the jack has a body, and the calibrating component is in said body.

10. The system of claim 9, wherein said jack and socket system is a USB plug structure.

11. The system according to claim 1, wherein the power supply is part of a base module from which the cable structure extends;

said cable structure including a security module configured to be secured to the associated electronic device;

said cable structure including a cable portion forming a security circuit extending from the base module to said security module;

said security module closing the security circuit when said security portion is secured to the electronic device, and said security module breaking the security circuit when the security module is removed from the electronic device, and an alarm system determining if the security circuit has been broken, said alarm system generating a visible or audible alarm responsive to a determination that the security circuit has been broken.

12. The system of claim 11, wherein the alarm is in the security module.

13. The system of claim 11, wherein the alarm is in the base module.

14. A system for displaying a plurality of electronic devices each being operable when electrical power is supplied thereto at a respective operating voltage through a respective power connector, said system comprising:

a power supply providing input electrical current at a first voltage;

a plurality of cable structures each being connected with the power supply so as to receive said input electrical current therefrom at said first voltage, and each having a respective power connector configured to electrically connect with the power receiving structure of a respective one of the electronic devices;

said cable structures each including a respective voltage regulator system receiving said input electrical current, and converting said input electrical current to a respective output electrical current at a respective output voltage and transmitting said output electrical current to said power connector so as to transmit an operating electrical current to the associated electronic device;

said voltage regulator system setting the output voltage of the output electrical current such that the operating electrical current delivered to the associated electronic device has a voltage that corresponds to the operating voltage of said electronic device;

wherein the voltage regulator system comprises a voltage regulator electrically connected with a calibrating component, said voltage regulator setting the output voltage of said output electrical current dependent upon an electrical characteristic of said calibrating component;

wherein the calibrating component is electrically connected with the voltage regulator via a releasable connector structure;

wherein said releasable connector structure also connects said voltage regulator system with the power connector;

wherein the releasable connector structure is a jack-and-socket electrical connection system comprising a socket connected with the voltage regulator, and a jack connected to an end of a cable having an opposite end connected electrically with said power connector so that said output current from said voltage regulator flows to said power connector through said cable;

wherein, the cable has at least four conductor wires therein, two of said wires being operatively connected with the power conductor so as to power the device, and another two of the wires being electrically connected with said calibrating component so as to form a circuit therethrough.

15. A system for displaying a plurality of electronic devices each being operable when electrical power is supplied thereto at a respective operating voltage through a respective power connector, said system comprising:

power supply providing input electrical current at a first voltage;

a plurality of cable structures each being connected with the power supply so as to receive said input electrical current therefrom at said first voltage, and each having a respective power connector configured to electrically connect with the power receiving structure of a respective one or the electronic devices;

said cable structures each including a respective voltage regulator system receiving said input electrical current, and converting said input electrical current to a respective output electrical current at a respective output voltage and transmitting said output electrical current to said power connector so as to transmit an operating electrical current to the associated electronic device;

said voltage regulator system setting the output voltage of the output electrical current such that the operating electrical current delivered to the associated electronic device has a voltage that corresponds to the operating voltage of said electronic device;

wherein the power supply is part of a base module from which the cable structure extends;

said cable structure including a security module configured to be secured to the associated electronic device;

said cable structure including a cable portion forming a security circuit extending from the base module to said security module;

said security module closing the security circuit when said security portion is secured to the electronic device, and said security module breaking the security circuit when the security module is removed from the electronic device, and an alarm system determining if the security circuit has been broken, said alarm system generating a visible or audible alarm responsive to a determination that the security circuit has been broken;

wherein the alarm is in the security module; and wherein the voltage regulator system is supported on the security module, and the cable portion of security circuit extends between the base module and the security module as part of a cable that also conducts the input electrical current to the voltage regulator system.

16. A system for displaying a plurality of electrical devices each operable by a user when electrical power is supplied thereto at a respective operating voltage via a respective power receiving structure thereof that is configured to electrically connect with a complementary power supply connector, said system comprising:

a base module having a power supply providing DC current at a first voltage to a plurality of electrical connector structures;

a plurality of a cable assemblies each being associated with a respective one of the electrical devices and comprising:

a first cable having first and second ends, the first end being electrically connected with a respective electrical connector structure of the base module and receiving said DC current therefrom at said first voltage;

a device module electrically connected with the second end of the first cable and secured to said electrical device;

the device module having a voltage regulator receiving the DC current, convering said DC current to an output current at an output voltage, and transmitting said output voltage to a device module output connector structure;

a first connector structure connected with the device module output connector structure and receiving said output current therefrom;

a second cable having first and second ends, said first end being electrically connected with the first connecting structure so that said output current is transmitted through the second cable;

a power connector on the second end of the second cable, said power connector complementarily engaging with the power receiving structure of said electrical device and transmitting said output current to the power receiving structure of said electrical device;

a calibrating component connected with the first connector structure and electrically connected therethrough with the voltage regulator;

the voltage regulator being configured such that the output voltage of the output current therefrom is dependent on an electrical characteristic of the calibrating component connected therewith;

said calibrating component being selected to set the output voltage of the output current of the voltage regulator such that the output current transmitted to the power receiving structure of said electrical device is at the operating voltage of said electrical device.

17. The system of claim 16, wherein the first cable includes a security circuit comprising at least one wire extending from the base module to the device module, said security circuit being closed when the said cable structure is assembled and the device module is secured to the electrical device, said security circuit remaining closed during normal operation of the system;

sensing circuitry determining if said security circuit has been interrupted; and an alarm system connected with the sensing circuitry and generating an audible or visible alarm responsive to a determination by the sensing circuitry that the security circuit has been interrupted.

18. The system of claim 17, wherein the device module includes a securement structure securing the device module to the electrical device;

the security circuit including an element that breaks the security circuit when the securement structure releases the device module from the electrical device, triggering said alarm.

19. The system of claim 16, wherein the electrical characteristic is resistance, and said calibrating component comprises a resistor.

20. The system of claim 16, wherein the first connector structure has at least four electrical contacts, two of said electrical contacts connecting with the calibrating component and another two of said electrical contacts connecting with the power connector.

21. The system of claim 16, wherein the first connector structure is a jack plugged into the device module output connector structure, said jack having a body, and said calibrating component being supported in the body of the jack.

22. The system of claim 21, wherein the jack is a USB connector and the output connector structure is a USB socket.

23. The system of claim 16, wherein said electrical connector structures of the base module are each sockets having electrical contacts;

the first end of the first cable including a jack configured to be matingly received in the respective socket of the base module, said first cable having lines therein electrically connecting through said jack to respective contacts in the socket;

the second end of the first cable connecting with the device module by a jack-and-socket system.

24. The system of claim 23, wherein at least one line of the first cable carries said DC current to the device module; and wherein at least one other line of the first cable forms a closed security circuit when the first cable is plugged into the base module socket and the jack and socket system of the device module and the device module is secured to the electronic device;

an alarm system continually or periodically determining whether the security circuit is closed, said alarm system generating a visible or audible alarm responsive to a determination that the security circuit is not closed.

25. A method for displaying a plurality of electrical devices each being supplied with electrical current at a respective operating voltage through a respective power input structure configured to electrically connect with a respective power connector structure fitting complementarily therewith, said method comprising:

providing a base module having a power supply with a plurality of electrical connector structures each supplied with DC current at a first voltage;

securing to each electronic device a respective device module;

connecting a first cable between each device module and a respective electrical connector structure of the base module so that said first cables each carry said DC current at said first voltage to the associated device module;

the device modules each having a respective voltage regulator receiving the DC current and converting said DC current to a respective output current;

connecting a second cable between each device module and the electrical device secured thereto, said second cable receiving the output current from the device module and transmitting the output current to a power connector complementarily engaging and electrically connecting with the power input structure of said electrical device;

said output current being transmitted to the electrical device at a voltage corresponding to the operating voltage of said device;

each of said voltage regulators setting the associated output current at a voltage that is dependent on an electrical characteristic of a respective calibrating component connected therewith, said calibrating component being part of the associated second cable connected with the device module.

26. The method of claim 25, wherein said first cables each form a respective security circuit linking the base module and the associated device module, said security circuit being closed when said device module is second to the associated electrical device;

said method further comprising:

detecting that the security circuit is closed after securement of the device module to the electronic device and connection of the first cable between the base module and the device module and initiating an alarm-set condition responsive to said determination;

detecting continuously or periodically during the alarm-set condition whether the security circuit remains closed, and responsive to a detection that the security circuit has been broken during the alarm-set condition, generating an alarm condition that includes activating a visible or audible alarm.

27. The method of claim 26, wherein said securing of the device module to said electronic device including applying a securement system that, when applied, closes a switch in the security circuit, and, when released, opens said switch so as to break the security circuit.

28. The method of claim 26, and further comprising:

illuminating at least one indicator light responsive to the initiation, of the alarm-set condition.

29. The method of claim 25, wherein the first cables each have two ends with modular jack structures, said electrical connector structures each being a socket receiving a respective jack structure at one end of the first cable, and said device modules each having an input socket receiving the respective ,jack structure at the other end of said first cable.

30. The method of claim 29, wherein said first cables comprise modular ethernet cables.

31. The method of claim 25, wherein the device modules each have a respective jack-and-socket structure modularly connecting with the associated second cable.

32. A cable assembly comprising:

a first electrical connector element having at least four electrical contacts configured to make four separate electrical connections when said first electrical connector element is secured in engagement with a complementary electrical connector structure;

a cable portion having two opposite ends and two wires each connected with a respective one of said electrical contacts of the first electrical connector element;

a device power input jack having at least two electrical contacts each connected electrically with a respective wire of said cable portion, said power input jack being configured to be matingly engaged with a power input structure as an electrical device so as to form an electrical connection therewith supplying electrical power to said electrical device at an operating voltage through said power input structure;

a calibrating component connected with two other contacts of the first electrical connector element so that a circuit containing the calibrating component is formed between said two contacts, said calibrating component having an electrical characteristic selected to cause a voltage regulator connected therewith to transmit electrical power at a voltage corresponding to the operating voltage of the electrical device.

33. The cable assembly of claim 32, wherein said first electrical connector is a jack element configured to be inserted in a complementary socket.

34. The cable assembly of claim 32, wherein the first electrical connector element has a body and the calibrating component is supported therein.

35. The cable assembly of claim 32, wherein the electrical characteristic is resistance, and the calibrating component comprises a resistor.

36. The cable assembly of claim 32, wherein the cable portion has at least four wires, and the calibrating component is supported in or adjacent the power input jack, two of said wires of the cable portion being electrically connected with the calibrating component.

37. A module for use in a system for display of an electrical device having an operating voltage, said module comprising:

a housing including a securement structure configured to secure said module to said electrical device;

a power input supported on said module and configured to be connected with a power input cable so as to receive therefrom an electrical current having an input voltage;

a voltage regulator supported in said housing and having an input and an output, said input being electrically connected with the power input so as to receive said electrical current therefrom;

said voltage regulator being configured to convert said electrical current to an output current at an output voltage and to transmit the output current through the output;

the voltage regulator having a calibrating input, said voltage regulator being configured to set the output voltage of the output current dependent on an electrical characteristic of a calibrating component connected electrically with said calibrating input;

a connector structure electrically connected with the calibrating input of the voltage regulator, said connector structure being configured to releasably connect with a complementary connection structure so that a user can selectively connect to said voltage regulator one of a plurality of calibrating elements each having a respective electrical characteristic corresponding to an associated output voltage of the voltage regulator, the electrical characteristic of the selected calibrating element being such as to cause said voltage regulator to set the output voltage to an appropriate voltage in view of the operating voltage of the electrical device.

38. The module of claim 37, wherein the electrical characteristic on which the output voltage depends is resistance.

39. The module of claim 37, wherein said output current is transmitted to said connector structure, said connector structure having contacts for connection with the calibrating element and other contacts for transmission of the output current to the electrical device.

40. The module of claim 37, wherein the connector structure is a socket configured to receive a jack and electrically connect therewith.

41. The module of claim 40, wherein the socket is a USB socket.

42. The module of claim 37, wherein the module has a security circuit portion connected with the power input, said security circuit portion being closed when the module is secured in engagement with the electrical device.

43. Tho module of claim 42, wherein the security circuit portion includes a securement assembly having a securing mechanism securing the module to the electrical device, said securement assembly including a switch that is closed when the module is secured to the electrical device by the securing mechanism, said switch opening so as to break the security circuit portion when said securing mechanism is made to release the electrical device.

44. The module of claim 43, wherein the input is an electrical connector structure having at least three contacts, one of said contacts receiving the electrical current, and the two other contacts constituting two ends of the security circuit portion.

45. The module of claim 44, wherein said electrical connector structure is a socket configured to receive and electrically connect with a jack on an end of said power input cable.

46. The module of claim 43, wherein the securement mechanism includes a screw assembly that is configured to screw into a threaded aperture in the electrical device, said screw assembly including a portion engaging and closing the switch when said screw assembly is tightened in said aperture.

47. A base module for a display of a plurality of electrical devices each having a respective operating voltage, said base module comprising:

a power source transmitting DC electrical current at a first voltage;

a plurality of electrical connector structures each with a plurality of electrical contacts, each electrical connector structure being configured to connect with a respective complementary electrical connector having a plurality of separate electrical contacts so as to transmit said DC electrical current to said complementary electrical connector to at least one of said contacts;

two of said contacts of said electrical connector structures being connected with an alarm circuit, said alarm circuit detecting whether a circuit connected to said two contacts of the electrical connection structure is closed or open said alarm circuit being configured to initiate an alarm-set condition of the alarm circuit responsive to an initial detection that the circuit connected to said two contacts is closed;

said alarm circuit being configured to trigger an audible or visible alarm responsive to a determination during the alarm-set condition that the circuit between said two contacts is open;

wherein the only electrical current transmitted through said electrical connection structures is the DC current at said first voltage, and an alarm sense signal transmitted to one of said two contacts by said alarm circuit for determining whether the circuit is open or closed;

wherein said electrical connector structures are sockets configured to receive jacks therein; and wherein the sockets are each six-pin ethernet sockets.

48. The base module of claim 47, wherein said power source receives AC current and converts it to said DC current.

49. The base module of claim 48, wherein said base module further comprises a backup battery connected with the alarm circuit so as to power the alarm circuit in the event that AC current to the base module is interrupted.

50. A system for displaying a plurality of electronic devices each being operable when electrical power is supplied thereto at a respective operating voltage through a respective power connector, said system comprising:

a power supply module providing input electrical current at a first voltage;

a plurality of cables each having a first end connected with the power supply and receiving the input electrical current therefrom at said first voltage;

each cable having a distal end connected with a respective module secured in engagement with a respective one of the electronic devices, each module having a respective power connector electrically connected with the power receiving structure of the respective one of the electronic devices;

each module receiving the input electrical current from the associated cable and supporting therein a respective voltage regulator system receiving said input electrical current;

the voltage regulator system converting said input electrical current to a respective output electrical current at a respective pre-selected output voltage and transmitting said output electrical current to said power connector so as to transmit an operating electrical current to the associated electronic device, the output voltage of the output electrical current corresponding to the operating voltage of said associated electronic device "wherein each voltage regulator system comprises a respective voltage regulator electrically connected with a respective calibrating component, each voltage regulator being configured to output any of a range of voltages, said voltage regulator outputting current at one of said voltages based upon an electrical characteristic of the respective calibrating component wherein the calibrating component is releasably connected to the voltage regulator by a mating connection structure so that a user can exchange a new calibrating component with a different electrical characteristic for the calibrating component and thereby change the output voltage of the associated voltage regulator system."

51. The claim according to claim 50, wherein the calibrating component comprises a resistor, and the electrical characteristic of the calibrating component that adjusts the output voltage of the voltage regulator is resistance.

52. The claim according to claim 50, wherein a security circuit detects whether the module has been separated from the associated electronic device and generates an alarm condition responsive to detecting such a separation.

53. The claim according to claim 50, wherein a security circuit detects whether there is an interruption in the cable connecting to the module and generates an alarm condition responsive to detecting said interruption.

54. The claim according to claim 50, wherein the input electrical current and the output electrical current are DC current.

* * * * *